United States Patent [19]

Harris

[11] Patent Number: 4,538,843

[45] Date of Patent: Sep. 3, 1985

[54] PRELOADED LATCH

[75] Inventor: Alfred W. Harris, Redmond, Wash.

[73] Assignee: The Boeing Company, Seattle, Wash.

[21] Appl. No.: 472,065

[22] Filed: Mar. 4, 1983

[51] Int. Cl.³ .................. E05C 5/02; E05C 19/14
[52] U.S. Cl. ..................... 292/113; 292/DIG. 31; 292/341.18
[58] Field of Search .......... 292/113, 246, 341.18, 292/DIG. 31; 244/53 R, 54, 129.4

[56] References Cited

U.S. PATENT DOCUMENTS

| | | |
|---|---|---|
| 234,866 | 11/1880 | Forg . |
| 671,792 | 4/1901 | Comber . |
| 2,003,006 | 5/1935 | Michelson ................. 4/68 |
| 2,622,911 | 12/1952 | Cooper ................. 292/341.18 |
| 2,669,477 | 2/1954 | Jewell ................. 292/341.18 |
| 2,699,962 | 1/1955 | Hogan et al. ............ 292/108 |
| 2,712,955 | 7/1955 | Andrews ................. 292/113 |
| 2,750,217 | 6/1956 | Landholt ................. 292/97 |
| 2,894,777 | 7/1959 | Hogan ................. 292/113 |
| 2,904,141 | 9/1959 | Henrichs ................. 189/35 |
| 2,927,812 | 3/1960 | Smith et al. ............ 292/196 |
| 2,944,848 | 7/1960 | Mandolf ................. 292/181 |
| 2,951,723 | 9/1960 | Bernhard ................. 292/275 |
| 3,259,411 | 7/1966 | Griffiths ................. 292/113 |
| 3,259,412 | 7/1966 | Wheeler ................. 292/113 |
| 3,347,578 | 10/1967 | Sheehan et al. .......... 292/113 |
| 3,664,696 | 5/1972 | Poe ................. 292/26 |
| 3,712,665 | 1/1973 | Klein ................. 296/137 |
| 4,053,177 | 10/1977 | Stammreich et al. ....... 292/113 |
| 4,116,479 | 9/1978 | Poe ................. 292/113 |
| 4,159,137 | 6/1979 | Richter ................. 292/123 |
| 4,183,564 | 1/1980 | Poe ................. 292/113 |
| 4,223,943 | 9/1980 | VanHulle et al. ......... 296/224 |
| 4,318,557 | 3/1982 | Bourne et al. ........... 296/113 |
| 4,320,912 | 3/1982 | Grace et al. ............ 292/341.18 |
| 4,365,775 | 12/1982 | Glancy ................. 292/113 |

FOREIGN PATENT DOCUMENTS 682872 of 0000 Fed. Rep. of Germany .
594198 of 0000 United Kingdom .

Primary Examiner—Richard E. Moore
Attorney, Agent, or Firm—Joan H. Pauly; Delbert J. Barnard

[57] ABSTRACT

A housing (14, 24) is mounted on each of two bodies. Each housing (14, 24) has an inwardly extending strut portion (16, 26) with an inner mating surface (18, 28). The mating surfaces (18, 28) are urged together to react a preload on the latch (12). The preload is provided by the tensioned engagement of a draw hook (62) and a catch pin (106). The draw hook (62) is pivotably mounted on a lever (42) that is pivotably mounted on housing (14). The catch pin (106) is slidably mounted on housing (24). The pivot axes of hook (62) and lever (42) are positioned to provide over-center latching action. A carrier (100) for the catch pin (106) has a shaft (102) that is threadedly engaged by a hollow internally threaded bolt (112). The outer end of the bolt (112) is axially engaged by a screw driver to adjust the longitudinal position of the carrier (100) along the load path to adjust the preload tensioning. Rotation of the carrier (100) is prevented by engagement of the carrier (100) in slots (142) in housing (24). The load path is generally perpendicular to the mounting surfaces of the bodies.

20 Claims, 9 Drawing Figures

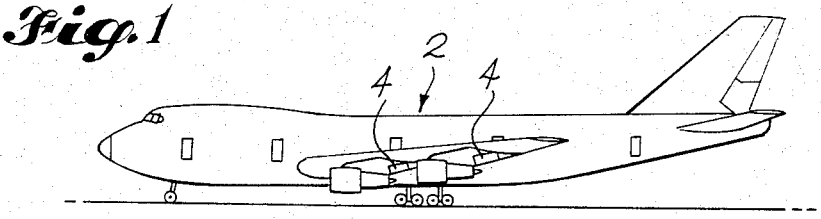
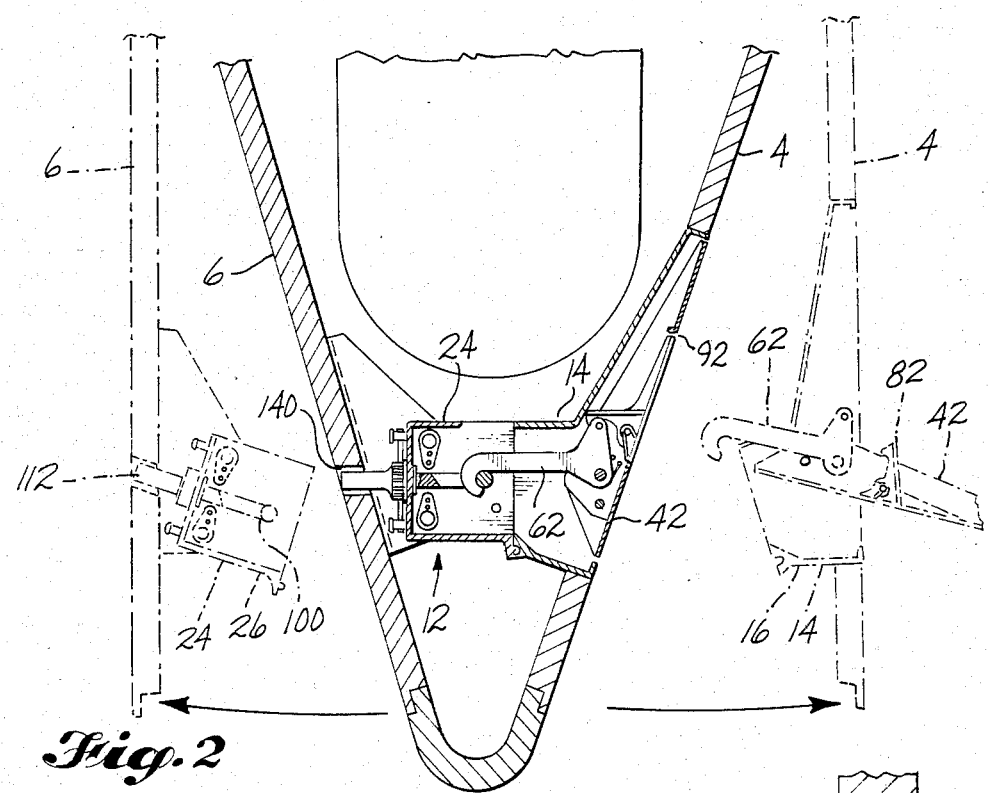
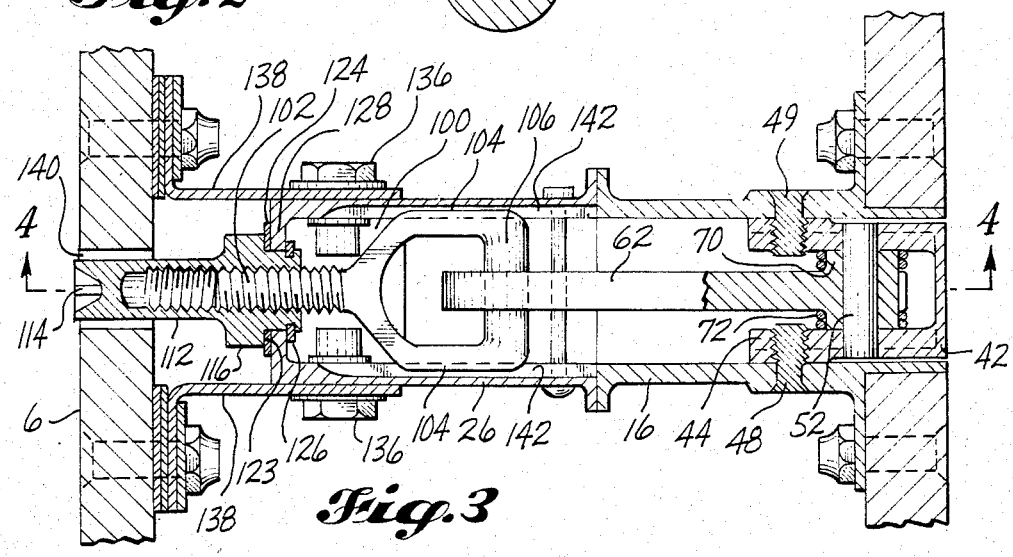

ately, a desirable amount of preload can be sufficient to cause a tendency for the panel to buckle. Therefore, there is a need to

PRELOADED LATCH

TECHNICAL FIELD

This invention relates to preloaded latches and, more particularly, to such a latch which reacts a load applied generally perpendicularly to the latch mounting surface, in which the preload on the latch is externally adjustable, and which forms a closed loop to react the preload.

BACKGROUND ART

This invention is directed primarily toward providing a latch for securing movable panels in exterior surfaces of aircraft when the load on the exterior surfaces is essentially perpendicular to the surfaces. Such loads are experienced, for example, by strut trailing edge fairings associated with wing mounted engines and by similar structures. The load on access panels on these structures has two major components. First, there is an aerodynamic load resulting from a lower pressure outside the structure than inside the structure. This aerodynamic load is generally directed outwardly and can be quite large even for a small pressure differential since the surface area of the access panel is usually quite large. Second, the access panel is subjected to a seal crush load that is always outwardly directed. The seal crush load results from the panel being pushed down to achieve a faired condition. Since there are usually many inches of seal around the access panel, the total force on the seal is quite large to provide the necessary compression. Current latching mechanisms that are suitable for use in securing external access panels in aircraft are not reliable for securing a panel subjected to such aerodynamic and seal crush loads since these latches react a load applied parallel to the latch mounting surface rather than a load applied essentially perpendicular to the latch mounting surface.

In addition to the outwardly directed load on the panel, there are other problems associated with providing latches for access panels on structures like strut trailing edge fairings. One such problem is a severe limitation on the amount of space available for the latch. Of course, the outer surfaces of the latch must be flush with the outer surfaces of the panel in order to keep the structure faired and maintain the aerodynamic efficiency of the aircraft. Therefore, all of the latch mechanism must be contained within the limited space inside the strut structure. The problem of the limited amount of interior space is aggravated in situations in which there are opposed access panels on either side of a fairly narrow fairing structure.

It is well known that, in order to obtain safe, smooth operation of the latch, it is desirable to tension the latch so that the latch is preloaded even when there is no external load on the panel. Unfortun provide some means for counteracting this tendency to buckle. Any such means for counteracting buckling must of course fit within the limited space available within the structure.

In many applications, it is important to maintain the preload tension on the latch within a fairly narrow optimum range. In order to accomplish this there must be means for adjusting the tension. Many currently known latching mechanisms do not provide for the adjustment of the preload tension. Of those that do provide for tension adjustment, many require that the latch be opened in order to obtain access to the adjustment means. This requires the latch to be opened and closed a number of times to adjust the tension on a cut-and-try basis. Such a procedure is unreasonably time-consuming and frequently results in a less than optimum adjustment of the tension.

An additional problem associated with latches for securing exterior access panels on aircraft is the danger of the latch not being properly engaged but appearing to be so engaged from the outside. This situation can be highly dangerous for obvious reasons.

The patent literature includes a very large number of patents that disclose latching devices. These patents include German Pat. No. 682,872, Great Britain Pat. No. 594,198, and the following United States Patents:
No. 234,866, granted Nov. 20, 1880, to P. Forg;
No. 671,792, granted Apr. 9, 1901, to E. F. Comber;
No. 2,003,006, granted May 28, 1935, to B. S. Michelson;
No. 2,622,911, granted Dec. 23, 1952, to La Mar S. Cooper;
No. 2,669,477, granted Feb. 16, 1954, to W. R. Jewell;
No. 2,699,962, granted Jan. 18, 1955, to J. E. Hogan et al;
No. 2,712,955, granted July 12, 1955, to W. R. Andrews;
No. 2,750,217, granted June 12, 1956, to E. C. Landholt;
No. 2,904,141, granted Sept. 15, 1959, to B. W. Henrichs;
No. 2,927,812, granted Mar. 8, 1960, to L. D. Smith et al;
No. 2,944,848, granted July 12, 1960, to H. I. Mandolf;
No. 2,951,723, granted Sept. 6, 1960, to B. S. Bernhard;
No. 3,259,411, granted July 5, 1966, to E. G. Griffiths;
No. 3,259,412, granted July 5, 1966, to F. Wheeler;
No. 3,347,578, granted Oct. 17, 1967, to R. W. Sheehan et al;
No. 3,664,696, granted May 23, 1972, to L. R. Poe;
No. 3,712,665, granted Jan. 23, 1973, to N. Klein;
No. 4,053,177, granted Oct. 11, 1977, to Stammreich et al;
No. 4,116,479, granted Sept. 26, 1978, to L. R. Poe;
No. 4,159,137, granted June 26, 1979, to R. D. Richter;
No. 4,183,564, granted Jan. 15, 1980, to L. R. Poe;
No. 4,223,943, granted Sept. 23, 1980, to VanHulle et al; and
No. 4,318,557, granted Mar. 9, 1982, to Bourne et al.

Cooper, Jewell, Landholt, Mandolf, Klein and VanHulle et al each disclose a latching device that is described as being capable of withstanding loads applied normal to the mounting surface or that appears to be designed to withstand such loads. The German and British patents each disclose a latching device that reacts loads at an acute angle to the mounting surface. Andrews, Landholt, Henrichs, Smith et al, Griffiths, Wheeler, Sheehan et al, Klein, Stammreich, et al, Poe U.S. Pat. No. 4,116,479, Richter, Poe U.S. Pat. No. 4,183,564, Bourne et al, and the German and British patents disclose latching mechanisms with over-center or similar preloaded latching action. Forg, Comber, Michelson, Cooper, Jewell, Andrews, Henrichs, Smith et al, Bernhard, the three Poe patents, Stammreich et al, Richter, and VanHulle at al disclose adjustable latching mechanisms.

The above patents and the prior art that is discussed and/or cited therein should be studied for the purpose of putting the present invention into proper perspective relative to the prior art.

DISCLOSURE OF THE INVENTION

A subject of this ivention is latching apparatus for use in an aircraft component having spaced-apart walls that include opposed movable panels, said latching apparatus securing the panels in flush positions. According to a basic aspect of the invention, the latching apparatus comprises first and second housings, each such housing having a generally inwardly extending strut portion with an inwardly facing mating surface and mounting means for mounting the housing on one of the panels. The apparatus also includes latch hook means mounted on the first housing and catch means mounted on the second housing for engaging the latch hook means to secure each of the panels in its flush position. Means is provided for tensioning the engagement of the latch hook means and the catch means to preload the latching apparatus. The latch hook means and catch means are positioned to provide a latch load path that is generally perpendicular to the panels. When the latching apparatus is in a latching position, the mating surfaces are urged together and the inwardly extending strut portions form a strut to react the preload on the latching apparatus.

According to another aspect of the invention, the means for tensioning includes a lever pivotably mounted on the first housing to pivot within an opening in the panel on which the first housing is mounted. The latch hook means includes a draw hook pivotably mounted on the lever. The pivotal axes of the lever and the draw hook are positioned to provide over-center latching action to tension the engagement of the draw hook and catch means and urge the mating surfaces together.

According to another aspect of the invention, the latching apparatus further comprises biasing means and auxiliary latch hook means. The biasing means biases the draw hook to pivot toward one end of the lever. The auxiliary latch hook means engages a portion of the draw hook to prevent pivoting of the draw hook with respect to the lever when the latching apparatus is in a latching position.

According to still another aspect of the invention, the latching apparatus further comprises adjustment means for adjusting the tensioning of the latch hook means and the catch means. Preferably, the catch means comprises a carrier, a catch bar carried by the carrier, and mounting means for the carrier. The carrier has a shaft end and an opposite yoke end with two arms. The carrier has a longitudinal yoke end with two arms. The carrier has a longitudinal axis coincident with the load path. The catch bar is carried between the two arms. The mounting means slidably mounts the carrier on the second housing. Preferably, the adjustment means includes means for engaging the shaft end of the carrier to adjust the position of the carrier along the load path to adjust the tensioning. The engaging means preferably includes an internally threaded hollow bolt with an open end into which the shaft end of the carrier is threadedly received and an opposite closed end with axially directed means for receiving a tool to rotate the bolt about the shaft end. Also preferably, the adjustment means further includes stop means for preventing the carrier from rotating. The stop means of the preferred embodiment includes two opposed support members, each of which has a slot therein into which one of the arms is slidably received. The axially directed means are positioned to be externally accessible through a suitable opening in the panel on which the second housing is mounted.

Another preferred feature is the inclusion in the latching apparatus of thrust bearing means positioned between an annular shoulder on said bolt and the second housing for transferring the preload on the carrier to the second housing. Still another preferred feature is a tongue and groove mating of the inwardly facing mating surfaces. In apparatus with this feature, one of the inwardly facing mating surfaces has a tongue thereon and the other said mating surface has a groove thereon. The tongue and groove are urged together when the latching apparatus is in a latching position to strengthen the strut and to carry shear forces between the latch hook means and the catch means.

Another subject of the invention is over-center latching apparatus for securing first and second bodies together, at least one of such bodies being movable with respect to the other. According to a basic aspect of the invention, the latching apparatus comprises first and second housings, each of which has a generally inwardly extending strut portion with an inwardly facing mating surface and mounting means for mounting the housing on a mounting surface of one of the bodies. A lever is pivotably mounted on the first housing to pivot within an opening in said mounting surface. A draw hook is pivotably mounted on the lever. Catch means is mounted on the second housing for engaging the draw hook to secure the bodies together. The catch means and the pivotal axis of the lever are positioned to provide a latch load path that is generally perpendicular to the mounting surface of the movable body. When the latching apparatus is in a latching position, the draw hook and catch means are tensioned to preload the latching apparatus, the mating surfaces are urged together, and the inwardly extending strut portions form a strut to react the preload on the latching apparatus.

Still another subject of the invention is an improvement in a latch mechanism of the type having a latch hook and a catch that engages the latch hook, with the engagement of the hook and catch being tensioned along a load path. According to a basis aspect of the invention, the improvement comprises a carrier for the catch, which carrier has a longitudinal axis coincident with the load path. The carrier has a threaded shaft end and an opposite yoke end with two arms between which the catch is carried. Mounting means slidably mounts the carrier to a body to be secured by the mechanism. Adjustment means is provided for adjusting the position of the carrier along the load path to adjust the tensioning of the hook and catch. The adjustment means comprises an internally threaded hollow bolt with an open end into which the shaft end of the carrier is threadedly received and an opposite closed end with axially directed means for receiving a tool to rotate the bolt about said shaft end. The adjustment means further comprises stop means for preventing the carrier from rotating. This stop means includes two opposed support members, each of which has a slot therein into which one of the arms is slidably received. The axially directed means is positioned to be externally accessible through a suitable opening in the body secured by the mechanism.

According to another aspect of the invention, the mounting means for slidably mounting the carrier includes an annular shoulder on the bolt, a support wall in a force transmitting relationship with the shoulder, and means for fixedly mounting the support wall on said body. Preferably, the mounting means further includes thrust bearing means positioned between the shoulder and one side of the support wall and retaining ring means engaging the bolt and abutting the other side of the support wall.

According to still another aspect of the invention, the latch mechanism further comprises ratchet means for preventing unwanted rotation of the bolt. Preferably, the ratchet means comprises a plurality of circumferentially-spaced, axially-elongated teeth projecting radially outwardly from the bolt and spring means yieldably urged against the bolt between the teeth.

Apparatus constructed according to the present invention is strong, durable, and easy to operate and is suitable for providing reliable latching of bodies that are subjected to loads that are primarily perpendicular to the latch mounting surface. The two housing feature of the invention is especially useful for securing opposed movable panels in flush positions on opposite exterior surfaces of a relatively narrow aircraft structure such as a strut trailing edge fairing. In this kind of environment, one of the housings may be mounted on each of the panels so that a single latch mechanism will secure both panels against the kind of perpendicular forces to which such a structure is subjected. The space saving advantage of the compactness of the apparatus constructed according to the invention is greatly enhanced by using a single apparatus for securing both panels.

In such an installation, the need to counteract the preload on the latching mechanism to prevent buckling of the panels is especially important. The strut forming feature of the two housings provides a means for reacting the preload on the latching apparatus that is simple and effective and requires little space. In the preferred embodiment of the apparatus of the invention, the draw hook, catch, two housings, and lever form a closed loop to carry the preload so that none of the preload is felt by the panels. Therefore, the latching apparatus may easily be provided with the desired amount of preload without any danger of causing buckling of the panels.

The tension adjustment feature of the invention allows the preload on the apparatus to be accurately adjusted. In the preferred embodiment, the adjustment may be quickly and easily made from outside the structure being secured by the latching apparatus without disengaging the latching apparatus. The result is greater efficiency and accuracy.

The prefered embodiment of the invention also has the important safety features of a clearly visible signal when the latch hook means is not properly engaged by the catch means. The auxiliary (safety) latch hook will not engage the draw hook if the draw hook is not in position. Therefore, the biasing of the draw hook to pivot with respect to the lever causes one end of the lever to automatically pop out to extend outwardly from the panel when the draw hook is not properly engaged. This gives a mechanic a clear visual signal that the latch is not properly engaged.

In embodiments of the invention in which the two portions of the strut have tongue and groove mating surfaces, the strut performs the additional function of carrying shear forces between the latch hook means and the catch means. This further contributes to the strength and reliability of the latching apparatus.

These and other advantages and features will become apparent from the detailed description of the best mode for carrying out the invention that follows.

BRIEF DESCRIPTION OF THE DRAWINGS

In the drawings, like element designations refer to like parts throughout, and:

FIG. 1 is a side elevational view of an aircraft of a type having opposed movable panels on the trailing edge fairings of struts for wing mounted engines.

FIG. 2 is a vertical sectional view of the strut trailing edge fairing of FIG. 1, showing in solid lines the preferred embodiment of the invention securing the opposed panels in their flush positions and in broken lines the latching apparatus disengaged and the panels swung outwardly into their open positions.

FIG. 3 is a sectional view of the preferred embodiment in its latching position, taken along the line 3—3 in FIG. 4.

BEST MODE FOR CARRYING OUT THE INVENTION

Figure 4:
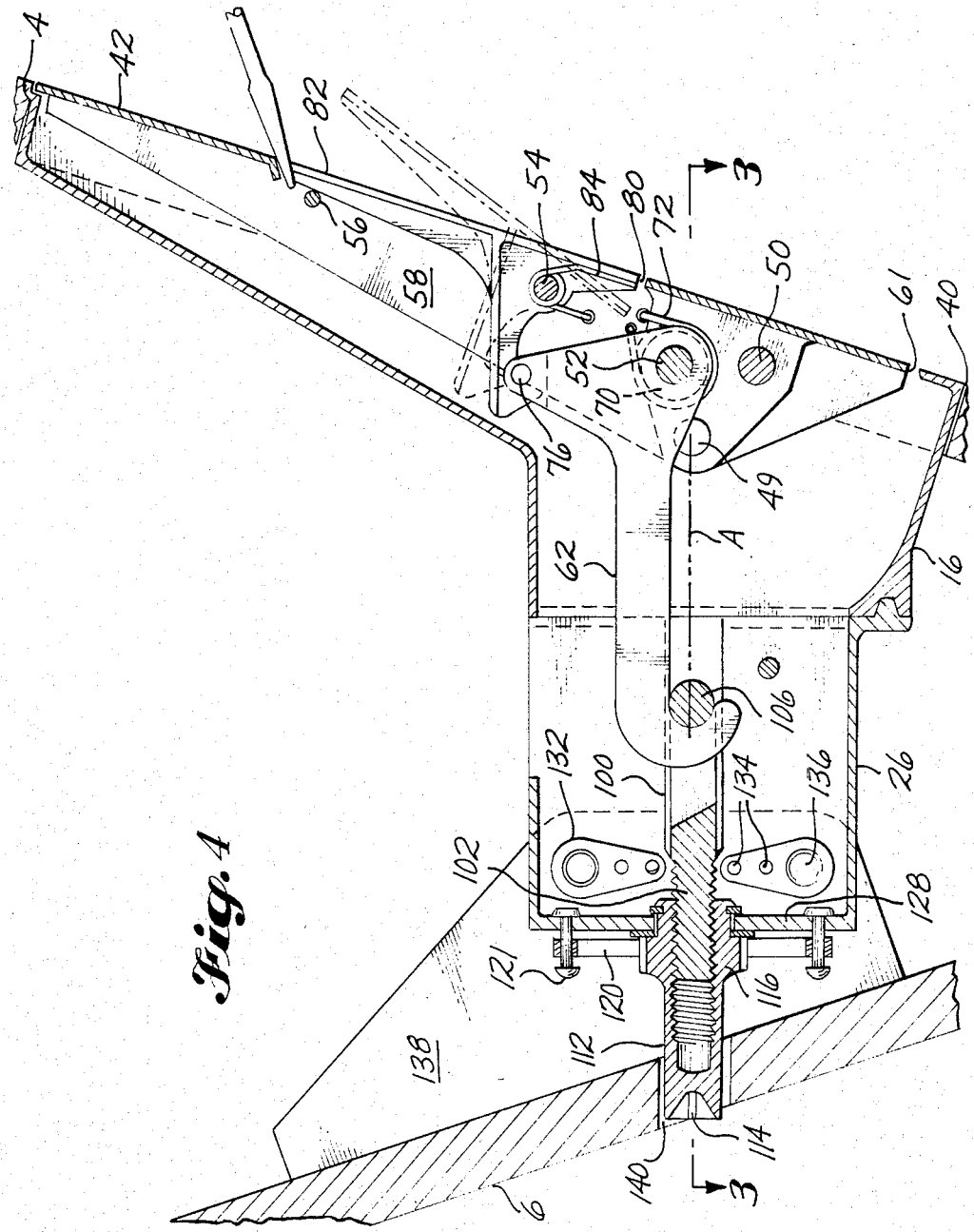
FIG. 4 is a sectional view taken along the line 4—4 in FIG. 3.

The drawings show latching apparatus 12 that is constructed according to the invention and that also constitutes the best mode of the invention currently known to the applicant. The latching apparatus 12 is shown in a typical installation in which the apparatus 12 is employed to secure opposed movable panels 4, 6 in flush positions on exterior surfaces of an aircraft 2. In FIGS. 1 and 2, the latching apparatus 12 is shown securing the opposed access panels 4, 6 on the trailing edge fairing of a strut for a wing mounted engine of an aircraft 2. As can be seen in FIG. 2, the spaced-apart walls of the trailing edge fairing form converging exterior surfaces of the fairing. This type of structure is typical of aircraft structures in which the latching apparatus of the present invention is particularly useful.

The preferred embodiment of the invention includes a latch portion and a catch portion, each of which is mounted on one of the opposed movable panels 4, 6. The latch portion is engaged by the catch portion in order to secure both panels 4, 6 in their flush positions. When the latch portion is disengaged from the catch portion, there is no connection between the two portions and the panels 4, 6 are free to move independently of each other. Of course, in an application other than that shown in the drawings, each of the two portions could be attached to some other movable body, or one of the portions could be attached to some other movable body with the other portion being attached to some fixed structure.

Figure 9:
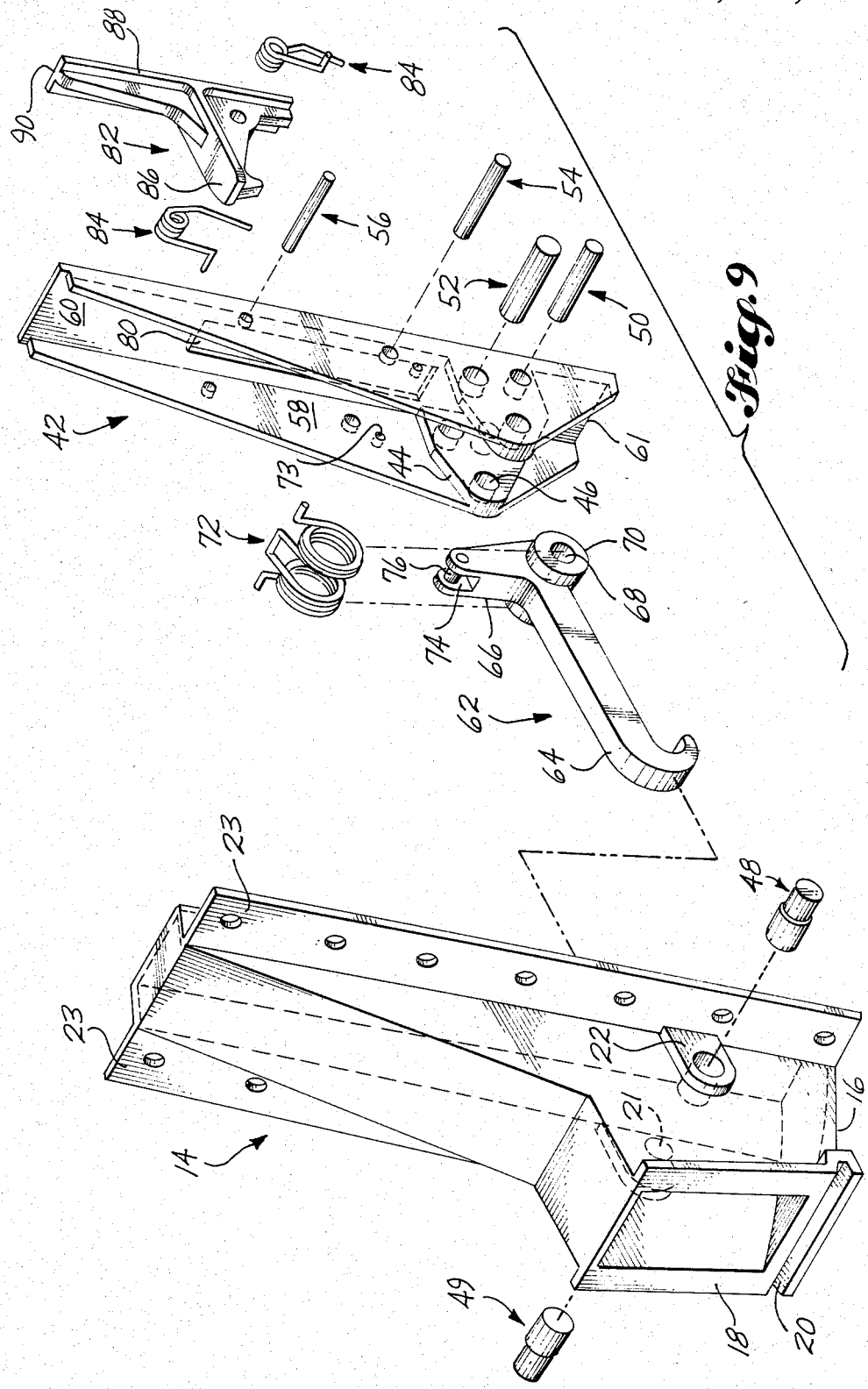
FIG. 9 is an exploded pictorial view of the latch hook portion of the preferred embodiment.

The latch portion of the preferred embodiment includes a housing 14 with mounting flanges 23 for securing the housing 14 to the panel 4. The housing 14 has two inwardly extending sidewalls with aligned holes 21 for receiving lever pivot pins 48, 49, described below. The holes 21 are reinforced as shown at 22 in FIG. 9. The housing 14 also has two inwardly extending end walls, one of which has an elongated sloping portion to accommodate a lever 42. The inner edge of each of the sidewalls and the non-sloping end wall is flanged to form an inwardly facing mating surface 18. The mating surface 18 of the end wall has a groove 20 extending along its length. The function of this groove 20 is described below.

It should be noted that in this description the term "inwardly" and the like have been used to indicate an inward direction with respect to the latching apparatus, that is a direction from the surface to which the apparatus is mounted toward the center of the latching apparatus.

In the preferred embodiment, a channel-shaped lever 42 is pivotably mounted on the housing 14 to pivot within an opening 40 in the panel 4. The lever 42 has two sidewalls 58 that extend inwardly from an outer wall 60. When the latching apparatus 12 is in a latching position, the outer wall 60 is flush with the outer surface of the panel 4. Each of the sidewalls 58 has a hole 46 extending laterally therethrough for receiving one of two pivot pins 48, 49 to pivotably mount the lever 42 on the housing 14. Each hole 46 is aligned with a hole 21 through one of the sidewalls of the housing 14. In the preferred embodiment, the pivot pins 48, 49 are separate coaxial members each of which is received through one of the reinforcements 22 on housing 14, the corresponding hole 21 through housing 14, and one of the holes 46 in lever 42. The lever sidewalls 58 also include opposed laterally extending holes for receiving a pivot pin 52 for a draw hook 62, a stop pin 50 for the draw hook 62, a pivot pin 54 for an auxiliary latch hook 82, and a stop pin 56 for the hook 82. The lever 42 also includes two load path reinforcing bars 44. The reinforcing bars 44 are attached to opposed surfaces of the sidewalls 58 inside the channel formed by the lever 42. Each bar 44 has three holes for receiving one of the pivot pins 48, 49, pivot pin 52, and stop pin 50. Each bar 44 surrounds one of the two pivot pins 48, 49 and pivot pin 52 to reinforce the load path from the draw hook 62 to the lever 42 to the housing 14.

The draw hook 62 is pivotably mounted on the lever 42 by pivot pin 52. The draw hook 62 has a hook portion 64 that extends generally inwardly from a lever portion 66. The lever portion 66 has holes 68 for receiving the pivot pin 52. These holes 68 are reinforced as shown at 70 in FIG. 9. The lever portion 66 projects generally upwardly (as shown) from the hook portion 64 and terminates at a channeled end 74 which carries a catch pin 76. A biasing spring 72 engages the lever portion 66 around reinforcers 70. The ends of spring 72 are received into holes 73 in lever sidewalls 58 and urged against lever 42 and the center of the spring 72 presses against the outer surface of lever portion 66 of hook 62 to bias the hook 62 to pivot toward one end 61 of the lever 42.

An auxiliary latch hook or safety catch 82 engages the catch pin 76 on the draw hook 62. The safety catch 82 is pivotably mounted on the lever 42 by means of pivot pin 54 to pivot within an opening 80 in lever outer wall 60. The safety catch 82 has a hook portion 86 and a lever portion 88 that is flush with the outer wall 60 when the latching apparatus 12 is in a latching position. Biasing springs 84 are provided for biasing safety catch 82 to pivot into engagement with draw hook 62. The ends of springs 84 are urged against lever 42. Movement of safety catch 82 towards engagement with draw hook 62 is limited by stop pin 56 which contacts an inner surface of the lever portion 88 of catch 82 when catch 82 is flush with lever 42. The end of the lever portion 88 that pivots outwardly to disengage the safety catch 82 forms a tool engaging end 90. In order to disengage the safety catch 82, a tool, such as the pointed end of a screw driver is inserted into a gap 92 between the end 90 of the lever portion 88 and the housing 14. (See FIG. 4.)

The catch portion of the preferred embodiment of the latching apparatus 12 includes a housing 24 that has a box-like construction. This housing 24 has four inwardly extending walls, three of which are flanged at their inner edges to form mating surfaces 28 which mate with mating surfaces 18 of housing 14 when the latching apparatus 12 is in a latching position. The flanged edge of one of the walls has an inwardly extending tongue 30 thereon which is received into the groove 20 on mating surface 18 when the latch is engaged. The three flange-edged walls of the latch housing 14 form a latch strut portion 16 that engages a catch strut portion 26 formed by the three flange-edged walls of the catch housing 24. When the latch is engaged and the mating surfaces 18, 28 are urged together, the two strut portions 16, 26 form a strut to carry a compression load.

The catch portion of the latching apparatus 12 also includes a carrier 100. This carrier 100 has a threaded shaft end 102 and an opposite yoke end. The yoke end has two arms 104, between which a catch pin 106 is carried. The catch pin 106 engages the hook portion 64 of the draw hook 62 to secure the latch and catch portions of the latching apparatus 12 together to thereby secure in position the structures to which the housings 14, 24 are attached.

The catch portion of the latching apparatus 12 in the preferred embodiment further includes an internally threaded hollow bolt 112 with an open end into which the shaft 102 of the carrier 100 is threadedly received. The opposite end of the bolt 112 is closed and has axially directed means 114 for receiving and engaging a tool. In the drawings, these means are shown in the form of cross shaped grooves 114 for engaging the end of a screw driver. The bolt 112 also has a circumferential flange 116 with a plurality of circumferentially-spaced, axially-elongated teeth 118 projecting radially outwardly therefrom. In the drawings, the number of teeth shown is twelve, but of course a different number of teeth could also be provided.

Figure 7:
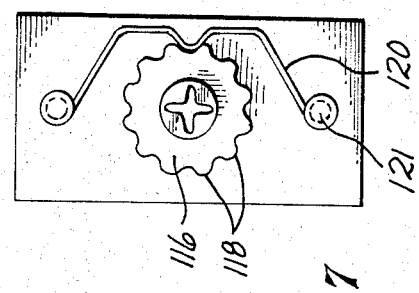
FIG. 7 is a detail showing the preferred embodiment of the ratchet engaging the toothed portion of the internally threaded hollow bolt.
Figure 8:
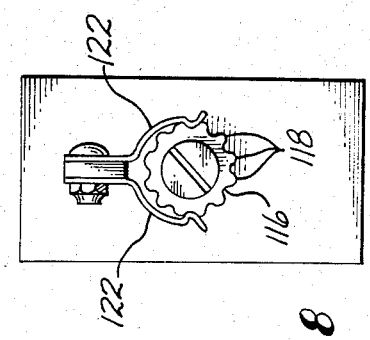
FIG. 8 is like FIG. 7 except that it shows an alternative embodiment of the ratchet.
Figure 6:
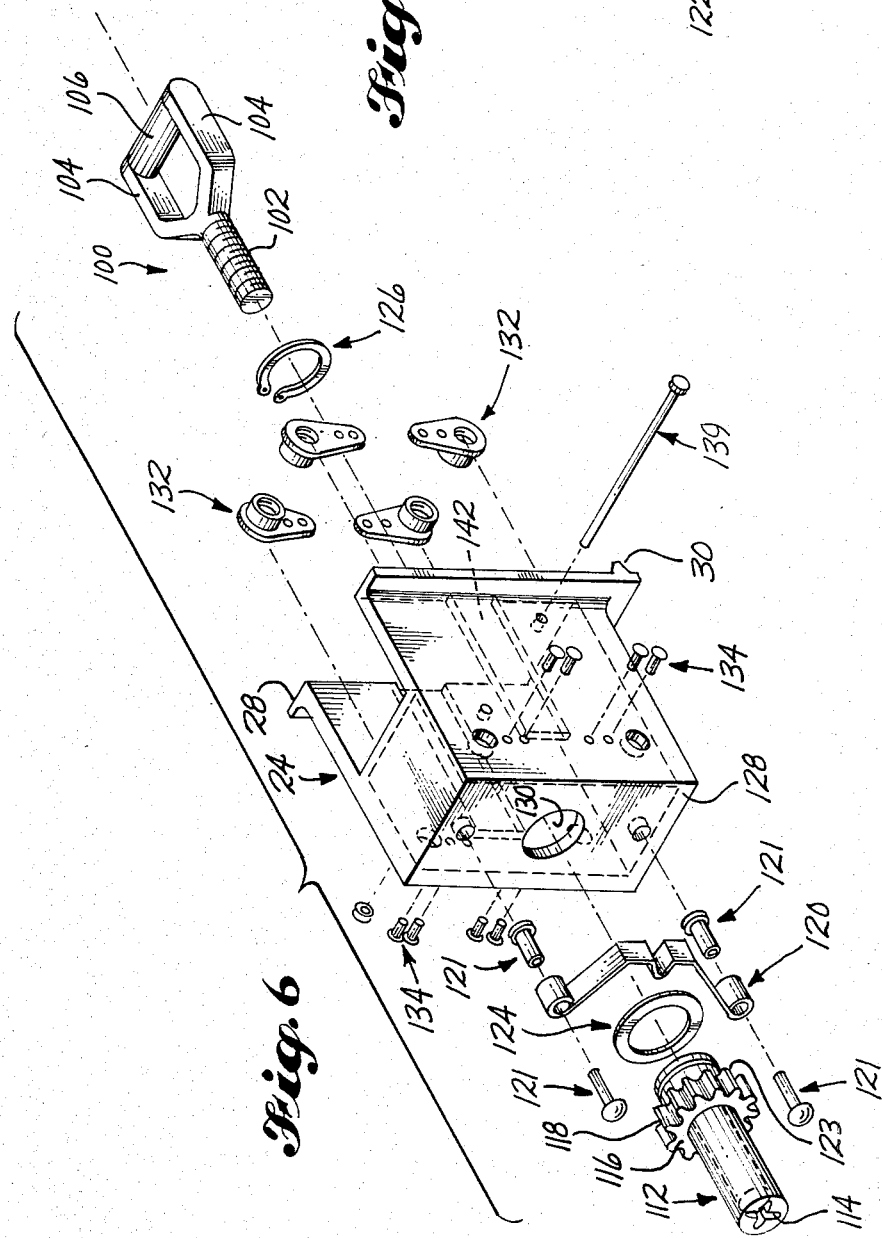
FIG. 6 is an exploded pictorial view of the catch portion of the preferred embodiment.

A tool such as a screw driver is used to engage the grooves 114 to rotate the bolt 112 about the shaft 102 of the carrier 100. A ratchet 120 yieldably engages the flange 116 to prevent undesired rotation of the bolt 112. The first preferred embodiment of the ratchet mechanism is best shown in FIGS. 6 and 7. In these figures, the ratchet is shown as a single flat spring 120 with two curved ends that are attached by suitable fasteners 121 to the outer end wall 128 of the housing 24. The spring 120 has a center portion between the two curved ends that is basically W-shaped with the broad flat surface of the center cusp of the "W" engaging the flange 116 between two of the teeth 118. This engagement of the flange 116 by spring 120 prevents spontaneous rotation of the bolt 112 but yields to allow the bolt 112 to be rotated by means of a tool. As should be obvious from FIG. 7, the larger the number of teeth 118 the finer the adjustment of the position of the carrier and, therefore, the finer the adjustment of the tensioned preload. FIG. 8 shows an alternative preferred embodiment of the ratchet spring 122. In this alternative embodiment, the spring 122 has two separate portions with opposed curved arms the ends of which engage diametrically opposed portions of the flange 116.

In the preferred embodiment, the bolt 112 is rotated about the shaft 102 to adjust the position of the carrier 100 along its longitudinal axis which coincides with the latch load path. When the bolt 112 is rotated, it is of course necessary to prevent rotation of the carrier 100 in order to allow the rotation of the bolt 112 to move the carrier 100 longitudinally and to avoid interfering with the functioning of the apparatus 12. Rotation of the carrier 100 is prevented by engagement of the yoke arms 104 with slots 142 in opposed inwardly directed sidewalls of the housing 24. In the preferred embodiment as shown in the drawings, the two sidewalls with the slots 142 are the vertical sidewalls of the housing 24. Each arm 104 is received into one of the slots 142 and rests against the bottom surface of the slot 142. Contact between the arms 104 and slots 142 prevents rotation of the carrier 100.

The carrier 100 is slidably mounted on the housing 24. As described above, the yoke arms 104 are received into the slots 142. The slots 142 are of sufficient length to allow the arms 104 to slide longitudinally within the slots 142. The shaft 102 of the carrier 100 projects through a hole 130 in the end wall 128 of the housing 24. The shaft 102 slides within the hole 130. In order to transmit loads from the carrier 100 to the housing 24, the bolt 112 is provided with an annular inwardly facing shoulder 123 that is in a force transmitting relationship with the end wall 128. A thrust bearing 124 surrounds the bolt 112 and is positioned between the shoulder 123 and the outer surface of the end wall 128. A snap ring or retainer ring 126 engages the bolt just inwardly of the end wall 128 to hold the bolt 112 and bearing 124 in position with respect to end wall 128.

The housing 24 is fixedly mounted to L-shaped support walls 138 that are in turn fixedly mounted to panel 6. Each vertical sidewall of housing 24 has two flanged nuts 132 attached by means of rivets 134 to its inner surface. Bolts 136 are received through corresponding holes in mounting wall 138 and the housing sidewall and engage nuts 132 to secure the connection between wall 138 and the sidewall of the housing 24.

A hole 140 is provided in the panel 6 to receive a tool for engaging the grooves 114 on the bolt 112. This provides for adjustment of the position of the carrier 100 without requiring the disengagement of the latching apparatus 12.

Another feature of the apparatus of the preferred embodiment that should be noted is the channeled inner end of the fourth inwardly extending wall of the catch housing 24. This fourth wall extends inwardly from end wall 128 approximately half way to the flanged edges of the other three walls that form the strut mating surfaces 28. This arrangement makes assembly of the catch portion of the apparatus 12 easier. When the shaft end 102 of the carrier 100 is disengaged from the bolt 112, the carrier 100 easily slides out of the housing 24.

Still another feature is the misengagement stop pin 139. This pin 139 contacts the draw hook 62 to prevent closing of the panel or panels if for some reason the draw hook 62 enters housing 24 on the wrong side of catch pin 106. When the panels are thus prevented from closing, the operator is immediately aware of what is wrong.

The operation of the latching apparatus 12 is as described below.

With the apparatus 12 engaged as shown in solid lines in FIG. 2 and in FIGS. 3 and 4, the point of a screw driver or similar device is inserted into the gap 92 (FIG. 4) to pivot the safety catch or auxiliary latch 82 outwardly. The outward position of the safety catch 82 is shown in broken lines in FIG. 4. When the safety catch 82 is pivoted outwardly, it is moved away from engagement with the catch pin 76 carried by the draw hook 62. The draw hook 62 and lever 42 are then free to pivot with respect to each other. Since the draw hook 62 is biased to pivot toward end 61 of lever 42 and since the pivotal axis of hook 62 is over-center (on the side of center line A opposite end 61), the lever 42 remains in its closed flush position until an external force is applied to pivot it. With the safety catch 82 disengaged, the operator pulls outwardly on catch 82 and presses inwardly on end 61 of the lever 42 to pivot end 61 inwardly and the opposite elongated lever end outwardly. With the lever 42 in this position, the elongated end may easily be grasped by the operator to pivot the end 61 further in the inward direction.

The catch bar 106, the lever pivot pins 48, 49, and the draw hook pivot pin 52 are positioned relative to each other to provide over-center latching and unlatching action. When the lever 42 is pivoted to latch or unlatch the apparatus 12, the pivot axis of the draw hook 62 moves from one side to the other side of the center line A defined by the catch pin or bar 106 and the lever pivot pins 48, 49. In addition, the pivot axis of the draw hook 62 moves inwardly when the apparatus 12 is unlatched.

When the operator pivots the lever 42 to disengage the apparatus 12, the draw hook pivot pin 52 is pivoted across center line A to the side of line A nearer end 61 of lever 42. As the lever 42 is further pivoted, pin 52 moves inwardly to translate draw hook 62 inwardly out of engagement with catch pin 106. When stop pin 50 on lever 42 engages draw hook 62, hook 62 is pivoted away from catch pin 106. The latching mechanism is then fully disengaged.

Figure 5:
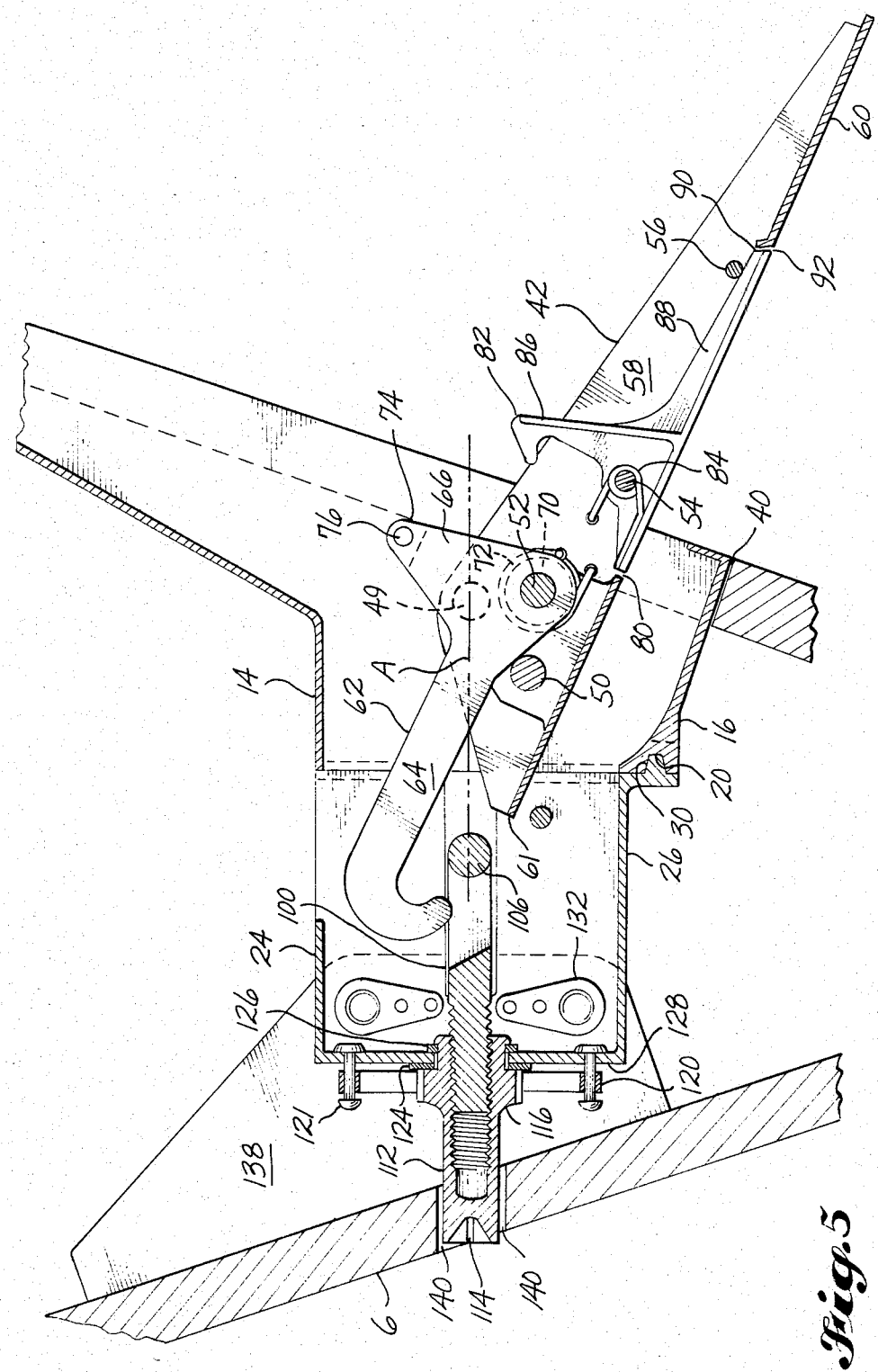
FIG. 5 is like FIG. 4 except that the latching apparatus is shown in its fully disengaged position.

The latching operation is essentially the reverse of the unlatching operation. With the lever 42 and draw hook 62 in the positions shown in FIG. 5, the movable body or bodies to be secured by the apparatus 12 are moved into position. The lever 42 is then pivoted in the opposite direction with lever end 61 moving outwardly. As lever 42 is pivoted, spring 72 pivots draw hook 62 into contact with catch pin 106 and the pivot axis of draw hook 62 moves outwardly thereby drawing draw hook 62 into tensioned engagement with catch pin 106. Once the lever 42 is flush with the outer surface of the panel 4, the tensioned engagement is complete and springs 84 bring safety catch 82 into engagement with catch pin 76 on draw hook 62 to prevent rotation of the lever 42 with respect to the draw hook 62.

The over-center latching action of the apparatus 12 functions to automatically tension or preload the engagement of draw hook 62 and catch pin 106 and also to provide a reliable engagement that is resistant to accidental unlatching. Although the preloading is desirable, it is undesirable for the panels 4, 6 to experience the preload. Therefore, the latching apparatus 12 is designed to form a closed loop in which strut portions 16, 26 react the preload to prevent the panels 4, 6 from experiencing any portion of the load. In addition to their function of forming a compression strut to react the preload, the strut portions 16, 26 also act to carry shear forces between the draw hook 62 and catch pin 106. The tongue and groove connection of the mating surfaces 18, 28 provide the capacity for carrying shear forces.

The preferred embodiment is designed to provide a load path that forms a steep angle (60° to 120°) with the movable mounting surface or surfaces. Referring to FIG. 4, the load path of the latching apparatus 12 is as follows. The load is transmitted from the hook portion 64 of the draw hook 62 to the catch pin 106 which transmits the load to the carrier 100. Thrust bearing 124 transmits the load from the carrier 100 to the housing 24 via the bolt 112. The load is then transmitted from housing 24 to housing 14 by means of mating surfaces 28, 18, which are urged together. The load is transmitted from housing 14 to lever 42 via pivot pins 48, 49. The load is transmitted through the lever (which is reinforced by load path reinforcing bar 44) from pivot pins 48, 49 to pivot pin 52 for the draw hook 62. Pin 52 then transmits the load to draw hook 62, which completes the closed loop of the load path.

It will be obvious to those skilled in the art to which this invention is addressed that the invention may be used to advantage in a variety of situations. Therefore, it is also to be understood by those skilled in the art that various changes, modifications, and omissions in form and detail may be made without departing from the spirit and scope of the present invention as defined by the following claims.

What is claimed is:

1. For use in an aircraft component having spaced-apart walls that include opposed movable panels, latching apparatus for securing the panels in flush positions, comprising:
    first and second housings, each said housing having a generally inwardly extending strut portion with an inwardly facing mating surface and mounting means for mounting the housing on one of the panels;
    latch hook means mounted on the first housing;
    catch means mounted on the second housing for engaging the latch hook means to secure each of the panels in its flush position; and
    means for tensioning the engagement of the latch hook means and the catch means to preload the latching apparatus;
    wherein the latch hook means and catch means are positioned to provide a latch load path that is generally perpendicular to the panels; and
    wherein when the latching apparatus is in a latching position, said mating surfaces are urged together and said inwardly extending strut portions form a strut to react the preload on the latching apparatus.

2. Latching apparatus as described in claim 1, in which the means for tensioning includes a lever pivotably mounted on the first housing to pivot within an opening in the panel on which the first housing is mounted; the latch hook means includes a draw hook pivotably mounted on the lever; and the pivotal axes of the lever and the draw hook are positioned to provide over-center latching action to tension the engagement of the draw hook and catch means and urge said mating surfaces together.

3. Latching apparatus as described in claim 2, further comprising biasing means for biasing the draw hook to pivot toward one end of the lever, and auxiliary latch hook means for engaging a portion of the draw hook to prevent pivoting of the draw hook with respect to the lever when the latching apparatus is in a latching position.

4. Latching apparatus as described in claim 1, further comprising adjustment means for adjusting the tensioning of the latch hook means and the catch means.

5. Latching apparatus as described in claim 4, in which:
    the catch means comprises a carrier having a shaft end and an opposite yoke end with two arms, said carrier having a longitudinal axis coincident with the load path; a catch bar carried between the two arms; and mounting means for slidably mounting the carrier on the second housing; and
    the adjustment means includes means for engaging the shaft end of the carrier to adjust the position of the carrier along the load path to adjust said tensioning.

6. Latching apparatus as described in claim 5, in which said means for engaging includes an internally threaded hollow bolt with an open end into which said shaft end is threadedly received and an opposite closed end with axially directed means for receiving a tool to rotate the bolt about said shaft end; and the adjustment means further includes stop means for preventing the carrier from rotating, said stop means including two opposed support members, each of which has a slot therein into which one of said arms is slidably received;
    said axially directed means being positioned to be externally accessible through a suitable opening in the panel on which the second housing is mounted.

7. Latching apparatus as described in claim 6, further comprising thrust bearing means positioned between an annular shoulder on said bolt and the second housing for transferring the preload on the carrier to the second housing.

8. Latching apparatus as described in claim 1, in which one of the inwardly facing mating surfaces has a tongue thereon, and the other said mating surface has a groove thereon, said tongue and groove being urged together when the latching apparatus is in a latching position to strengthen the strut and to carry shear forces between the latch hook means and the catch means.

9. Over-center latching apparatus for securing first and second bodies together, at least one of said bodies being movable with respect to the other, comprising:
    first and second housings, each said housing having a generally inwardly extending strut portion with an inwardly facing mating surface and mounting means for mounting the housing on a mounting surface of one of the bodies;
    a lever pivotably mounted on the first housing to pivot within an opening in said mounting surface;
    a draw hook pivotably mounted on the lever; and
    catch means mounted on the second housing for engaging the draw hook to secure the bodies together;
    wherein the catch means and the pivotal axis of the lever are positioned to provide a latch load path that is generally perpendicular to said mounting surface of the movable body; and
    wherein when the latching apparatus is in a latching position, the draw hook and catch means are tensioned to preload the latching apparatus, said mating surfaces are urged together, and said inwardly extending strut portions form a strut to react the preload on the latching apparatus.

10. Latching apparatus as described in claim 9, further comprising biasing means for biasing the draw hook to pivot toward one end of the lever, and auxiliary latch hook means for engaging a portion of the draw hook to prevent pivoting of the draw hook with respect to the lever when the latching apparatus is in a latching position.

11. Latching apparatus as described in claim 9, further comprising adjustment means for adjusting the tensioning of the draw hook and catch means.

12. Latching apparatus as described in claim 11, in which:
the catch means comprises a carrier having a shaft end and an opposite yoke end with two arms, said carrier having a longitudinal axis coincident with the load path; a catch bar carried between the two arms; and mounting means for slidably mounting the carrier on the second housing; and
the adjustment means includes means for engaging the shaft end of the carrier to adjust the position of the carrier along the load path to adjust said tensioning.

13. Latching apparatus as described in claim 12, in which said means for engaging includes an internally threaded hollow bolt with an open end into which said shaft end is threadedly received and an opposite closed end with axially directed means for receiving a tool to rotate the bolt about said shaft end; and the adjustment means further includes stop means for preventing the carrier from rotating, said stop means including two opposed support members, each of which has a slot therein into which one of said arms is slidably received.

14. Latching apparatus as described in claim 13, further comprising thrust bearing means positioned between an annular shoulder on said bolt and the second housing for transferring the preload on the carrier to the second housing.

15. Latching apparatus as described in claim 9, in which one of the inwardly facing mating surfaces has a tongue thereon, and the other said mating surface has a groove thereon, said tongue and groove being urged together when the latching apparatus is in a latching position to strengthen the strut and to carry shear forces between the draw hook and the catch means.

16. In a latch mechanism of the type having a latch hook and a catch that engages the latch hook, with the engagement of the hook and catch being tensioned along a load path, the improvement comprising:
a carrier for the catch; said carrier having a longitudinal axis coincident with the load path, a threaded shaft end, and an opposite yoke end with two arms between which the catch is carried;
mounting means for slidably mounting the carrier to a body to be secured by the mechanism; and
adjustment means for adjusting the position of the carrier along the load path to adjust the tensioning of the hook and catch; said adjustment means comprising an internally threaded hollow bolt with an open end into which said shaft end of the carrier is threadedly received and an opposite closed end with axially directed means for receiving a tool to rotate the bolt about said shaft end, and stop means for preventing the carrier from rotating, said stop means including two opposed support members, each of which has a slot therein into which one of said arms is slidably received;
said axially directed means being positioned to be externally accessible through a suitable opening in said body.

17. A latch mechanism as described in claim 16, in which the mounting means for slidably mounting the carrier includes an annular shoulder on the bolt, a support wall in a force transmitting relationship with the shoulder, and means for fixedly mounting the support wall on said body.

18. A latch mechanism as described in claim 17, in which said mounting means further includes thrust bearing means positioned between the shoulder and one side of the support wall, and retaining ring means engaging the bolt and abutting the other side of the support wall.

19. A latch mechanism as described in claim 16, further comprising ratchet means for preventing unwanted rotation of the bolt.

20. A latch mechanism as described in claim 19, in which the ratchet means comprises a plurality of circumferentially-spaced, axially-elongated teeth projecting radially outwardly from the bolt, and spring means yieldably urged against the bolt between said teeth.

* * * * *

UNITED STATES PATENT AND TRADEMARK OFFICE
CERTIFICATE OF CORRECTION

PATENT NO. : 4,538,843
DATED : September 3, 1985
INVENTOR(S) : Alfred W. Harris

It is certified that error appears in the above-identified patent and that said Letters Patent are hereby corrected as shown below:

Column 2, line 65, "at" should be -- et --.

Column 3, line 5, "ivention" should be -- invention --.

Column 3, lines 51 and 52, delete "The carrier has a longitudinal yoke end with two arms."

Column 4, line 44, "basis" should be -- basic --.

Column 5, line 53, "features" should be -- feature --.

Signed and Sealed this

First Day of July 1986

[SEAL]

Attest:

DONALD J. QUIGG

Attesting Officer  Commissioner of Patents and Trademarks